(12) United States Patent
Goldfarb et al.

(10) Patent No.: US 6,287,492 B1
(45) Date of Patent: Sep. 11, 2001

(54) ACTIVITY APPARATUS AND METHOD FOR COMPRESSING PLIANT TRANSLUCENT MATERIAL TO GENERALLY INSTANTANEOUSLY CREATE A LITHOPHANE-TYPE PICTORIAL WORK

(75) Inventors: Adolph E. Goldfarb, Westlake Village; Martin I. Goldfarb, Santa Monica, both of CA (US)

(73) Assignee: Eddy & Martin Goldfarb and Accociates, Northridge, CA (US)

( * ) Notice: Subject to any disclaimer, the term of this patent is extended or adjusted under 35 U.S.C. 154(b) by 0 days.

(21) Appl. No.: 09/312,078

(22) Filed: May 15, 1999

(51) Int. Cl.[7] .................................................. B29C 43/02
(52) U.S. Cl. ......................... 264/40.5; 264/320; 264/325
(58) Field of Search ................... 264/40.1, 135, 264/132, 319, 320, 322, 325, 225, 226, 40.5, 77, 313, 245, 246, 247, 299

(56) References Cited

U.S. PATENT DOCUMENTS

| | | | |
|---|---|---|---|
| 3,709,766 | * | 1/1973 | Brody . |
| 4,414,731 | * | 11/1983 | Reimer ................................. 264/135 |
| 5,571,598 | * | 11/1996 | Butler et al. .......................... 264/319 |
| 5,925,426 | * | 7/1999 | Galerneau . |

* cited by examiner

Primary Examiner—Mathieu D. Vargot
(74) Attorney, Agent, or Firm—Ashen & Lippman

(57) ABSTRACT

Activity or craft apparatus and method for simply, inexpensively, and generally instantaneously creating a thin lithophane-like pictorial work that provides a picture or image when light passes through the work from the rear. The work is formed by compressing a formable translucent material. The illustrated apparatus includes a contoured forming surface that is a reverse image of the contoured recessed picture-providing front surface of a desired lithophane-type pictorial work. The translucent material is compressed against the forming surface to form the material into a thin panel that has, at the interface with the forming surface, the contoured recessed picture-producing front surface. In one form the forming surface is mounted on a stamp. The stamp may be hand held or maybe mounted on a press or the like. Thickness limiting stops may be provided to control and limit the final thickness of the compressed finished work. The material may be supported on a suitable surface such as a non-opaque wall of a light-box so that the picture provided by the finished work can be seen by the user as soon as the work is formed and the stamp is removed. In another preferred embodiment, the contoured forming surface may be transparent so that the picture of the work can be seen as soon as the work is formed and backlit, without having to separate the work from the forming surface.

6 Claims, 8 Drawing Sheets

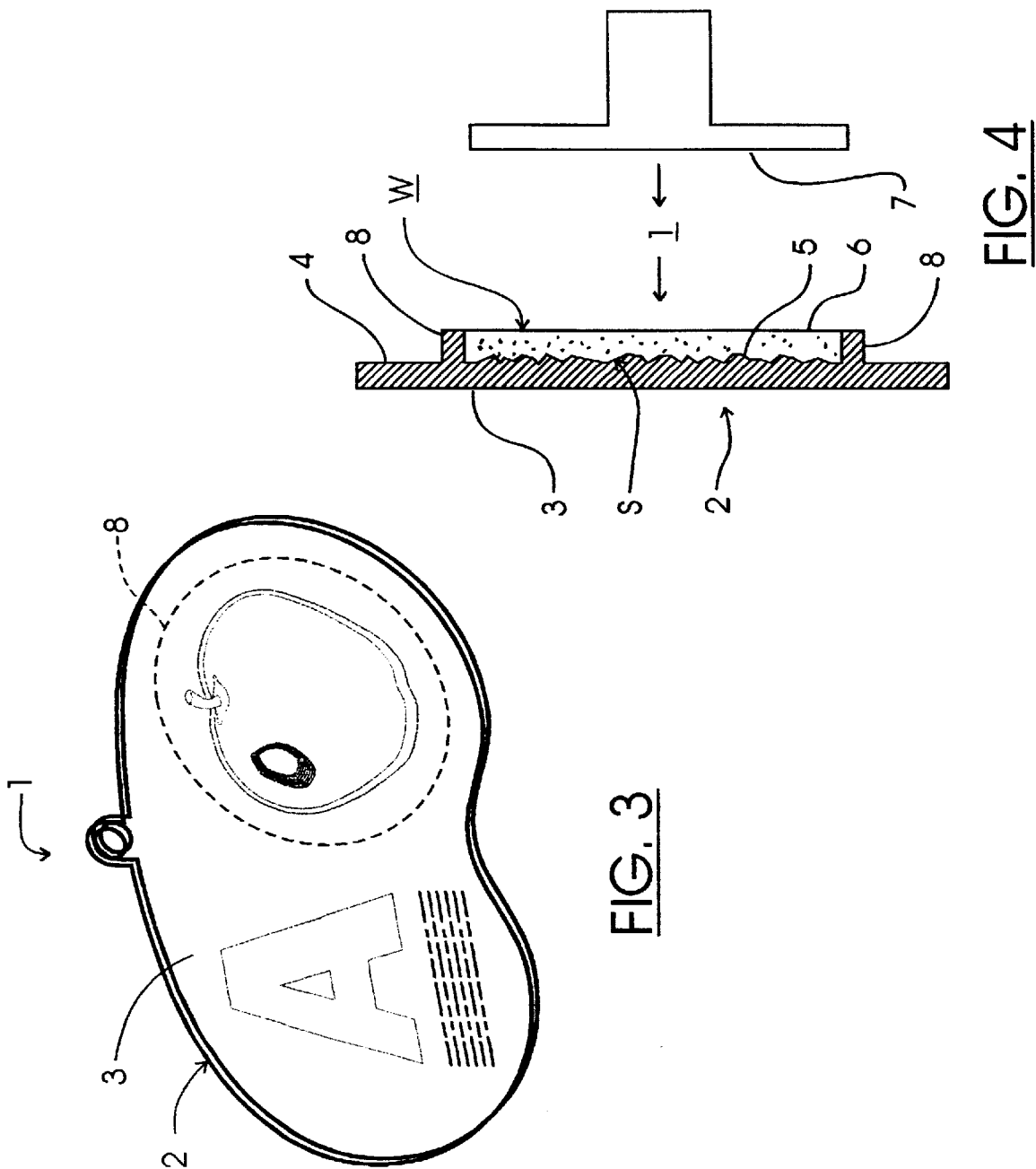

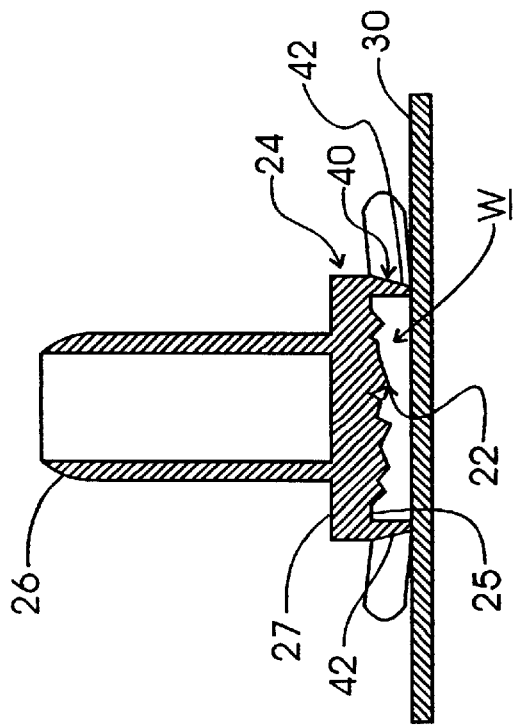
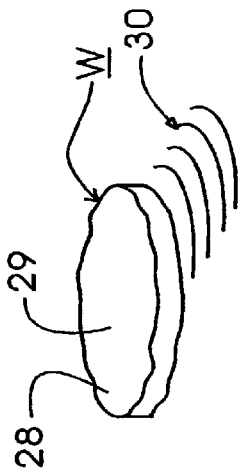
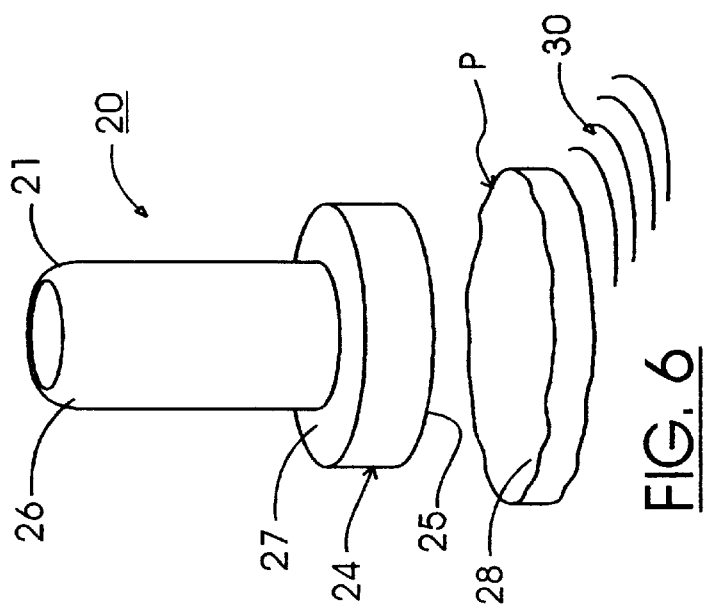

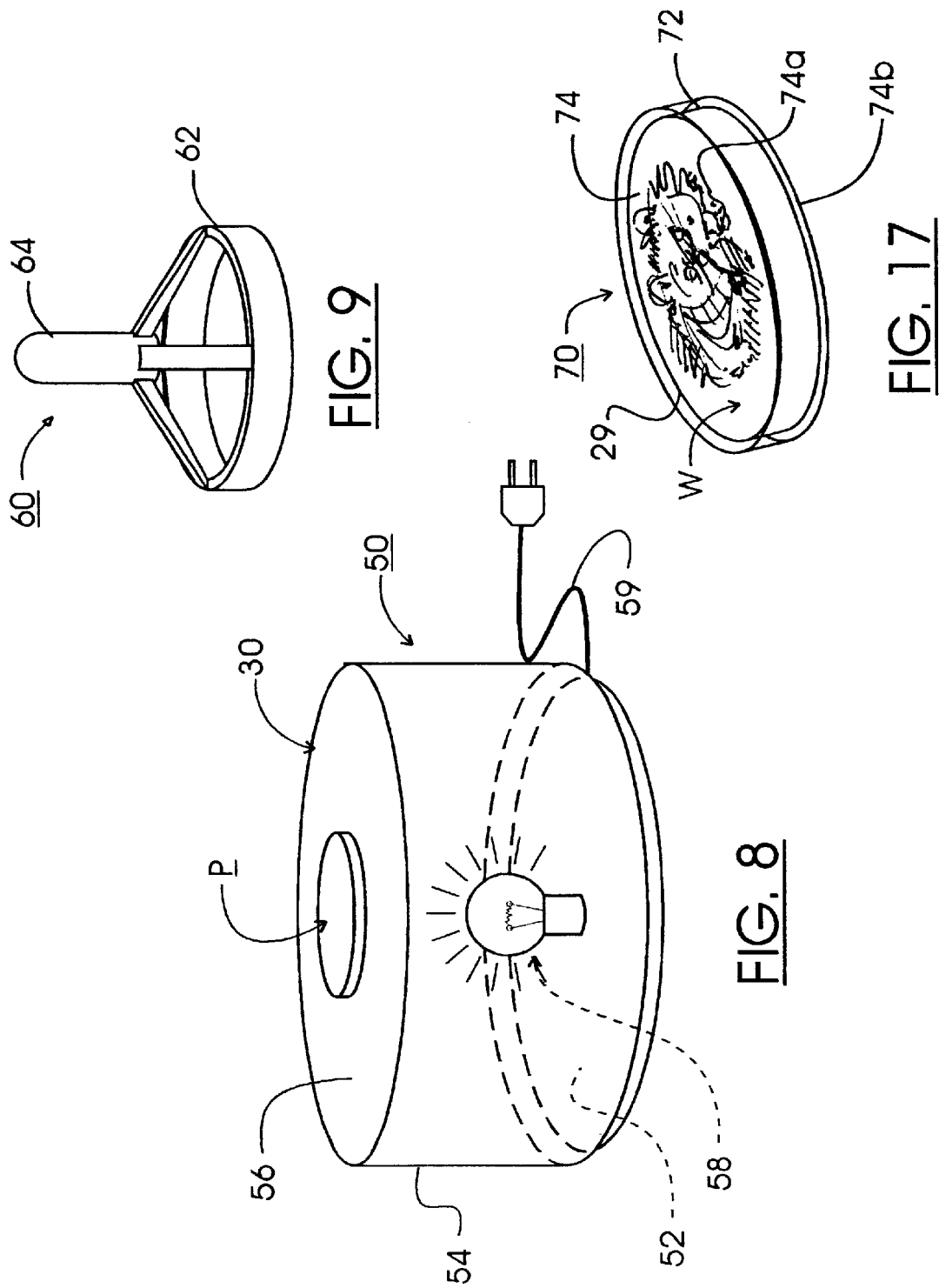

ACTIVITY APPARATUS AND METHOD FOR COMPRESSING PLIANT TRANSLUCENT MATERIAL TO GENERALLY INSTANTANEOUSLY CREATE A LITHOPHANE-TYPE PICTORIAL WORK

FIELD OF INVENTION

Activity or craft formation of lithophane-type pictorial works or objects by compressing pliant translucent material.

BACKGROUND OF THE INVENTION

Traditional lithophane pictorial works, often in the form of panels that can be hung in windows or in front of a light source, have been made of porcelain. Such a porcelain lithophane work is thin, translucent and has varying thickness such that, when viewed from the front while light passes through the work from the rear, a picture of extreme beauty and delicacy is provided. More particularly, the different thicknesses provide different shades of lightness and darkness. The thicker an area the darker that area will appear. The thinner an area the lighter that area will appear. The variation can go from very dark to very light. Changes can be sudden and dramatic or very gradual and subtle. Each such work has a contoured recessed front picture-providing surface that provides the varying thickness and thus the picture for that work.

To provide a porcelain lithophane work, initially a soft pattern is hand sculpted or carved by a craftsman/artist working with molding material such as wax. The wax is back-lighted so that the progress of the picture can be observed as the contour of the recessed front surface of the wax pattern is sculpted.

Then the wax pattern is used to create a plaster mold with a cavity with a contoured convex surface that is the reverse of the sculpted recessed front surface of the pattern. The plaster mold in turn is used to mold reproductions of the pattern, with each reproduction having the desired contoured recessed front surface. Initially an opaque slick or flowable slurry of porcelain-forming material is introduced into the plaster mold. The slurry must remain in the mold for a prolonged drying period, during which moisture from the slurry passes into the plaster mold. Finally the dried reproduction is removed from the mold and fired or baked in a high temperature oven to produce the final translucent picture-providing porcelain lithophane work. The resulting porcelain lithophane work is beautiful and valuable. However, it's creation is costly, time consuming and requires great skill.

It would be highly desirable to be able to create lithophane-type pictorial works or objects in a simple, quick and inexpensive manner.

It would be especially desirable to be able to control and limit the creating apparatus and process so that it can be used by those of low skill level and/or dexterity, such as young children. In this regard, the more that can be done by the children, without any or with very limited supervision, the more rewarding and exciting it will be for the children.

Similarly, because of children's short attention spans, it is highly desirable that they can see the results of their efforts just as quickly as possible and without extended delays as would be required to dry and/or fire the objects to complete them.

SUMMARY OF THE DISCLOSURE

FIGS. 1 and 2 are schematic representations of a prior art lithophane panel of porcelain. The porcelain which is translucent is formed at its front surface so as to present a viewable picture when light is shown through the panel. The panel front surface is formed with gradients of depth or thickness so that when light is shown through, the thinner portions appear lighter and the thicker portions appear darker. FIG. 2 is a cross section of a portion of the lithophane panel representing the variations in thickness at the front surface S that faces the observer. Light passes through the translucent panel from the opposite rear surface R.

As also noted above, the lithophane process is expensive and time consuming and requires substantial skill.

The illustrated apparatus and method provide a simple, inexpensive and quick way to produce lithophane-type pictorial works by compressing formable translucent material in a manner so simple and undemanding that it can be done by a small child. The result is immediately observable by the user. No drying or firing is required to achieve the finished work.

One presently preferred embodiment of the apparatus comprises a wall having a three dimensional contoured forming surface that is a reverse image of a the contoured recessed front surface of a desired finished thin lithophane-type pictorial object or work. When pliant translucent material is compressed against the forming surface, that material is made into the desired work in the form of a thin panel having, at the interface with the forming surface, the desired contoured recessed front surface. The picture of the work may be viewed immediately from the front of the work as light is passed through the translucent work from the rear. In this regard, the forming surface and its wall may be transparent so that the picture can be seen as soon as the material is compressed and without having to separate the forming surface from the material. Alternatively, if the forming surface and its wall are not transparent, they may simply be separated from the finished work so that the work can then be viewed.

One particular form of the apparatus may include a stamp having a three-dimensional contoured stamping, compressing or forming surface that is a reverse image of the contour of the recessed front surface of the desired finished lithophane-type pictorial object or work. The stamp may be used to compress a pliant translucent material that is positioned on a base or support that has generally flat ancillary surface, to form the material into the work without further activity or delay. The stamp may be hand held or may be mounted on a press or the like. The surfaces may be reversed, with the stamp having the flat ancillary surface and the base may have the forming surface.

The quality of the picture provided by the lithophane-type work or object is enhanced by maintaining the thickness of the completed work within predetermined limits. For this purpose, thickness limiting stops may be provided to control and limit the final thickness of the compressed completed work. The stops could be mounted on the stamp, on the base, or on the press. By way of example, the stops could be in the form of a plurality of projections extending outwardly from the stamp toward the base. To further assist in controlling the thickness of the completed work, the material may be provided to the user as, or the user may be provided means to create, individual material portions. Each portion has a volume that will result, after having been compressed by the stamping surface, in a completed work of approximately the size of the stamping surface and of a thickness somewhat greater than the maximum variation in thickness between the highest and lowest points of the stamping surface.

As also illustrated, the base may be a non-opaque wall of a light box so that the picture provided by the finished lithophane-type work can be seen by the user as soon as the work is formed. In this regard, the stamp may be transparent so that the lithophane picture can be seen right through it without having to even remove the stamp, or the stamp can simply be moved out of the way.

After they are completed, the finished lithophane-type works could be mounted or supported in various ways that allow light to pass through them to reveal their pictures.

IN THE DRAWINGS

FIG. 3 is a perspective view of a presently preferred apparatus for producing lithophane-type pictorial works.

FIG. 4 is a side sectional view of the apparatus of FIG. 3.

FIG. 5 is a perspective view of a completed lithophane-type pictorial work.

FIG. 6 is a perspective view of another presently preferred apparatus for providing lithophane-type pictorial works.

FIG. 7 is a side view of the apparatus of FIG. 6.

FIG. 8 is a perspective view of a light box for use with the apparatus of FIG. 6.

FIG. 9 is an edge cutter for use with the apparatus of FIG. 6.

FIG. 17 is a frame for holding a lithophane-type craft work produced with the apparatus of FIG. 6.

DETAILED DESCRIPTION OF THE DRAWINGS

Figure 2:
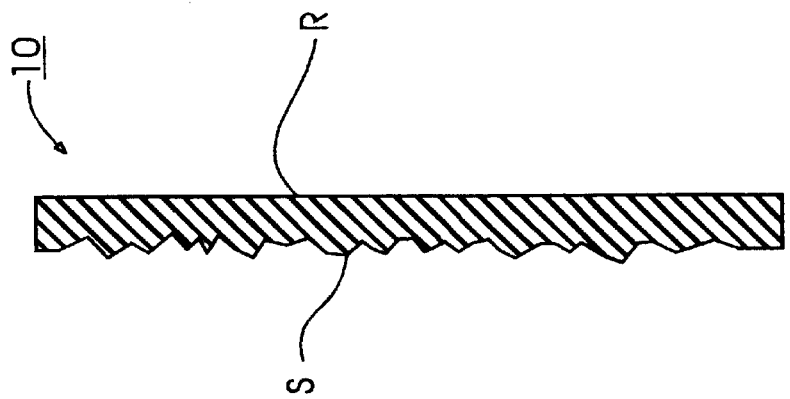
FIG. 2 is an enlarged cross sectional view of the panel of FIG. 1.
Figure 1:
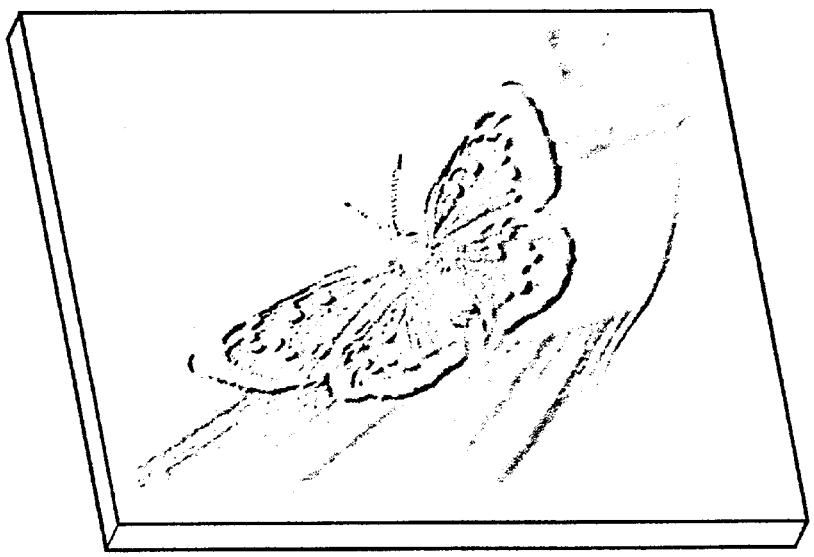
FIG. 1 is a perspective view of a prior art lithophane panel.

As noted above, FIGS. 1 and 2 schematically illustrate a prior art lithophane porcelain work 10. FIG. 1 shows the lithophane pane and the picture or image it presents. FIG. 2 schematically shows the variations in thickness of the pane that produce the variations in light and dark that form that picture or image.

FIGS. 3 and 4 illustrate a simple but extremely effective form of apparatus 1 that is a presently preferred embodiment of the present invention. The apparatus 1 includes a transparent wall or panel 2 which may be made of clear glass, plastic or the like. Illustrated wall 2 is thin, generally rectangular and flat. Wall 2 has a front face 3 and a rear face 4. A large letter A is printed on the front face 3. The rear face 4 has a contoured three-dimensional forming surface 5 that is the reverse image of a desired contoured recessed front picture-producing surface S of a desired lithophane-type pictorial work W such as shown in FIG. 5. As shown in FIG. 4, a quantity or work piece P of a pliant formable solid translucent material may be compressed against the forming surface 5 to form the material into a thin panel that provides the desired work W. In this regard, at the interface of the material with the forming surface 5, the material is compressed to form the desired contoured recessed front picture-producing surface S. Since the wall 2 is transparent, the work W can be viewed immediately upon formation through the wall, the observer being positioned in front of front face 3 and light passing through the work W and the wall 2 from the rear.

The translucent material may simply be compressed against the forming surface 5 by the user with her fingers. The material may be flattened to a thin panel with rear face generally flat and generally uniformly spaced from the wall rear face 4. The precision of this flatness and spacing is not critical since the light coming through the rear surface 6 of the panel of material is diffused. The critical portion of the panel of material in terms of the quality of the picture produced is the variation in the front recessed surface S of the panel. Thus, while a flat ancillary compression surface 7 such as illustrated in FIG. 4 could be utilized to some advantage to flatten the rear surface 6, such ancillary surface is not required.

A peripheral rib 8 may be provided at the wall rear face 4 surrounding the forming surface 5. This rib 8 will serve to contain the material and define its outer limit to a circle as shown in FIG. 3. The contoured front surface S of the finished work W can be seen through the wall 2 as the picture of an apple that matches the letter "A". If the material is applied to the rear of the wall 2 while the user is looking at the front of the wall, this picture suddenly "appears" as if by magic. The picture is virtually not visible or noticeable without the translucent material since the wall 2 and the contoured forming surface 5 are all transparent.

FIGS. 6 and 7 illustrate one form of apparatus 20 that is a presently preferred embodiment of the invention for easily, quickly and inexpensively providing a lithophane-type pictorial work or object in a single operation. The work may be viewed and used immediately without added operations or delay.

Illustrated apparatus 20 comprises a simple hand held stamp 21. Stamp 21 has a hard three-dimensional stamping surface 22 that is the reverse image of the contoured recessed front surface of the desired completed lithophane-type pictorial work or object W (shown in FIG. 5). The stamp 21 is used to compress a soft pliant translucent material that is supported on a generally flat base or ancillary surface 30. FIG. 6 illustrates an individual portion or work piece P of such material. For efficient operation, each portion P may be approximately the volume which, when compressed by the stamp, will produce a lithophane-type pictorial work W that has the transverse size or dimension of the stamping surface 22 and a thickness that is somewhat greater than the maximum variation between the highest and lowest points of the stamping surface.

Control of the final thickness of the lithophane-type work is desirable to provide a good result. If the final work is too thin, it will loose its structural integrity and may even have holes or openings that are unsupported when the work is removed from the base surface. Such holes would also allow glare of the light to come through the work. If the final work is too thick, sufficient light may not be able to pass through the work, or some of the desired contour may not be fully formed. To accurately and positively control this final thickness, suitable means such as stops 40 may be provided that control the final distance between the stamping surface 22 and the base or ancillary surface 30.

Considering the apparatus 20 of FIGS. 6 and 7 in further detail, the stamp 21 includes a generally disk-shaped base section 24, a hand graspable handle section 26 secured to one face 27 of the base section, and the shaped or contoured forming surface 22 mounted to the opposite face 25 of the base section. The apparatus 20 is illustrated in a particular orientation for convenience of description: the base or ancillary surface 30 is shown as generally horizontal and the movement of the stamp 21 is generally downwardly in the vertical direction. While this is an effective orientation, it will be appreciated that the apparatus 20 will work effectively if the base surface 30 is at an angle from the horizontal, or oriented in some other way so long at there was suitable means to maintain the material portion or work piece P on the support surface. For example, there might be an adhesive relationship between the work piece and the base surface 30 or there might be mechanical fingers or the like that held the work piece in place on the base surface.

To produce a lithophane-type pictorial work W using the illustrated apparatus 20, the user could place a portion of the work piece P upon the base surface 30, could grasp the stamp 21 by the handle section 26, position the stamping or forming surface 22 over the work, and press downwardly to compress the work piece and form its upper surface 28 as a reverse image of the recessed contour of the stamping or forming surface. This is illustrated schematically in FIG. 7. The amount of compression is limited by the stop means 40 in the form of a plurality of downwardly extending projections 42 located adjacent the edge of the stamping surface 22. The projections 42 engage the base surface 30 to define the desired amount of compression of the work piece. This insures that the material of the work piece is fully formed with the desired lithophane-type contour, but without being overly compressed.

The stamp 21 may then be withdrawn, leaving the formed and contoured lithophane-type pictorial work W disposed on the base surface 30 as shown in FIG. 5. The formed depressions 29 in the work will provide the desired picture or image as described above. The work may be removed from the base surface, and viewed from the front with light coming through from the rear. This could be natural light or artificial light such as from a flashlight (not shown).

Alternatively, a light box 50 such as shown in FIG. 8 could be provided. The illustrated light box 50 includes a bottom wall 52 and a generally cylindrical side wall 54. There is a transparent or translucent top wall 56 which may serve as the base surface 30. A portion P of the material is shown disposed on that top wall 56. A source of light such as a light bulb 58 is disposed within the light box and may be provided with power by an electrical plug-in cord 59 or by batteries (not shown). When the light bulb 58 is turned on, it shines upwardly through the transparent or translucent support surface top wall 56. The stamp 21 may be used to compress the work piece P disposed on the top wall 56 as described above. As soon as the stamp 21 is removed, light will shine through the top wall 56 and through the formed lithophane-type pictorial work W so that the image or picture can be immediately observed by the user.

Various materials may be utilized. It has been found that material sold under the trademark "Play Doh" provides a very effective material. It is suitably soft, pliant, translucent and non-toxic. A work made of "Play Doh" which has a maximum thickness of about one-eighth of an inch or less provide very good pictures. Other materials of similar qualities may be utilized, as for example various clays, putties, soft plasters or plastic type materials, etc. For use with apparatus 20, it is desirable that the material has some coherence so that once it is formed it will generally maintain its configuration and integrity so that it can be moved, handled, etc. The material may be reusable or it might be a one-time-use air-drying compound. The material may come in various colors and may be suitable for being colored by use of paints or the like.

FIG. 9 illustrates a cutter ring 60 that has a generally circular cutting blade 62 and a handle portion 64. This cutter ring 60 may be pressed down over a lithophane-type pictorial work P after it has been compressed by the stamp 21, to separate and allow removal of any material extending beyond a desired diameter for the completed work. This provides a neat and finished looking work and also insures that the work will fit into a holder or frame 70 such as shown in FIG. 17 for preservation and display of the work.

The illustrated frame 70 includes a circular rim or ring 72 for receiving the illustrated finished lithophane-type pictorial work W. A pane 74 may extend across each side of the ring 72 to retain the work within the frame 70. The pane 74*a* adjacent to the contoured recess 29 is transparent for viewing the presented picture and the other pane 74*b* is transparent or translucent to allow passage of light. At least one of these panes 74 would be openable to allow the work to be mounted in the frame 70 and removed when desired.

Figure 19:
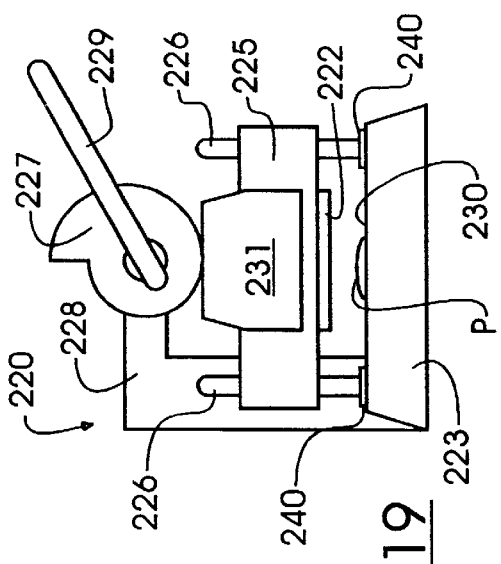
FIG. 19 is a schematic side view of another alternate embodiment of apparatus in the form of a press with a vertically movable stamp carrier.
Figure 18:
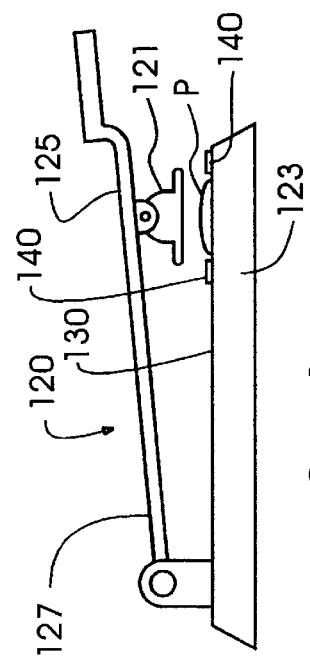
FIG. 18 is a schematic side view of an alternate embodiment of apparatus in the form of a press with a pivoted arm.

FIGS. 18 and 19 illustrates two alternate embodiments of apparatus in accordance with the present invention. Apparatus shown in FIG. 18 is in the form of a small press 120. The press 120 has a base section 123 that provides a generally horizontal flat base surface 130 for a work piece P. A stamp 121 is pivotally mounted adjacent the free end 125 of an elongated lever arm 127 that is pivotally mounted on the base section 123. One or more stops 140 may be provided on the base surface 130 to engage the stamp 121 and limit the compression of the work piece P.

The apparatus illustrated in FIG. 19 comprises a linear action press 220. Press 220 includes a base section 223 that provides a generally horizontal flat base surface 230 for a work piece P. A stamp 221 having a stamp surface 222 is mounted on a carrier member 225. The carrier member 225 is supported for linear vertical movement on two or more upright rods 226 that are supported on the base section 223. The carrier member 225 may be biased upwardly to a position spaced above the base surface 230, by suitable biasing means (not shown). The carrier member 225 and the stamp 221 may be selectively moved downwardly so that the stamping surface 222 engages and compresses the work piece. This downward movement is achieved by selective rotation of a cam member 227 that is supported on an arm section 228 that extends upwardly from the base section 223. A handle 229 is connected to the cam member 227 for rotating the cam member to move the stamp 221 downwardly. Suitable stops 240 are provided to control the compression of the work piece P.

Figure 10:
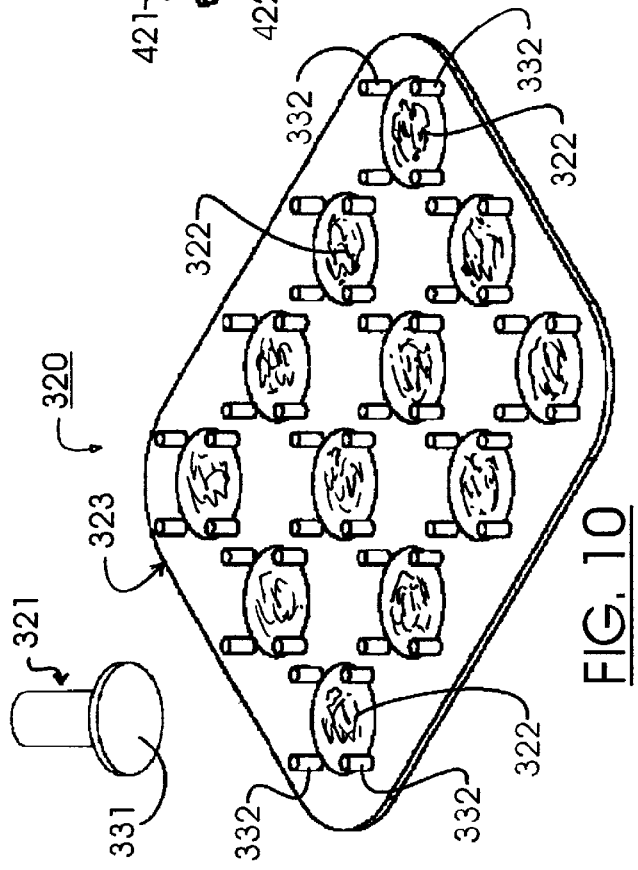
FIG. 10 is a perspective view of another alternate embodiment of apparatus in the form of a base section with a plurality of individual forming surfaces for use with a flat ancillary compression surface.

FIG. 10 illustrates another preferred embodiment of apparatus 320 in accordance with the present invention. In apparatus 320 a plurality of stamping or forming surfaces 322 are arranged in space-apart upwardly facing positions on a base section 323. The base section 323 is generally flat and rectangular, and adapted to lie generally horizontally on a table, floor or the like. The contoured forming surfaces 322 thus extend upwardly in this embodiment rather than downwardly. A stamp 321 has a generally flat ancillary compression surface 331 for engaging and compressing a work piece disposed on one of the upwardly facing forming surfaces 322. To align and guide the stamp 321 with each forming surface 322, four upright pins 332 are positioned around each forming surface. It will be observed that in this apparatus 320 the positions of the base surface and the forming surface have been reversed from their respective positions in the prior embodiments.

Figure 11:
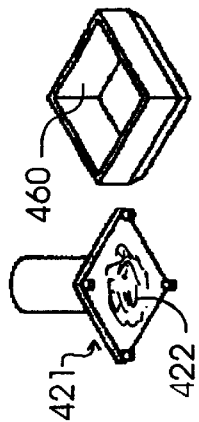
FIG. 11 illustrates a modified form of stamp and cutter.

FIG. 11 illustrates an alternate embodiment of stamp. Stamp 421 has a rectangular shape rather than the circular shape of stamp 20. Cutter 460 is rectangular for use with stamp 421.

Figure 12:
FIG. 12 illustrates another modified form of stamp.

FIG. 12 shows a circular stamp 521 having a different handle section 526 than handle section 26 of stamp 20.

Figure 13:
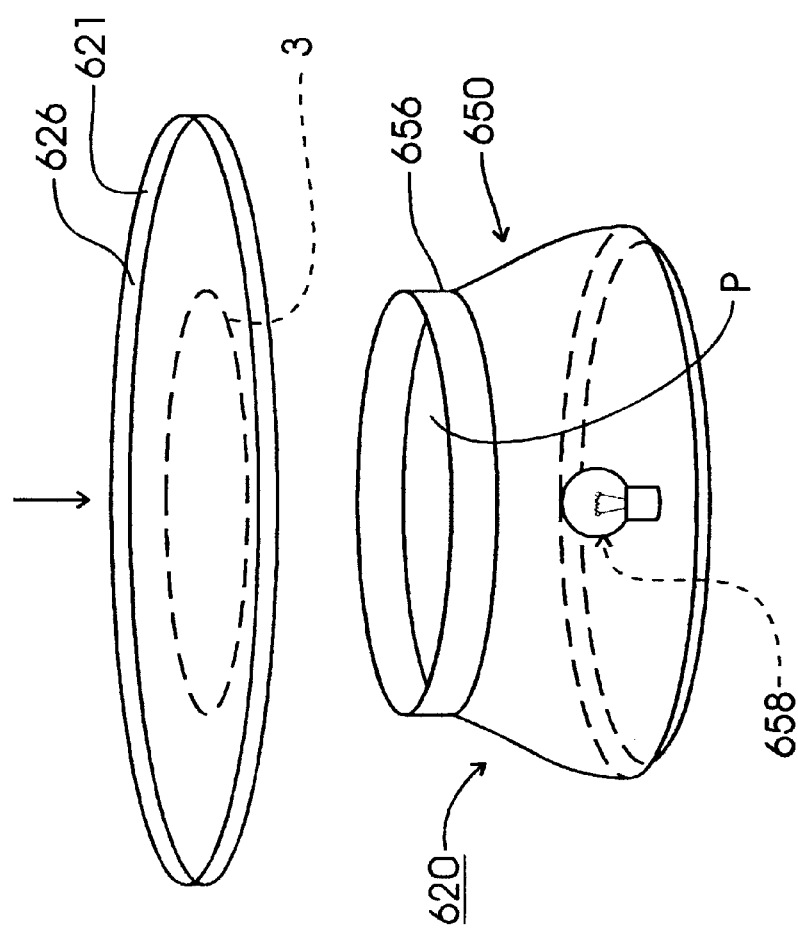
FIG. 13 illustrates another alternative embodiment of apparatus having a transparent stamp.

FIG. 13 illustrates yet another apparatus 620 that is a preferred embodiment of the present invention. Apparatus 620 includes a light box 650 with a light source 658 and a translucent oval-shaped upper wall 656. Upper wall 656 has an upwardly facing base surface 630 upon which a work piece P of pliable translucent material is disposed. Apparatus 620 also includes an oval-shaped stamp 621 having a contoured downwardly directed central stamping or forming surface 622 that matches the base surface 630. The stamp 621 extends outwardly beyond that forming surface 622 to provide a peripheral edge 626 that the user may grasp to manipulate the stamp.

Illustrated stamp 621 is made of a transparent material such as clear glass or plastic. Thus, when the work piece P is compressed to form the final lithophane-type pictorial work, the picture provided by the work may be seen immediately without removal of the transparent stamp 621.

Figure 14:
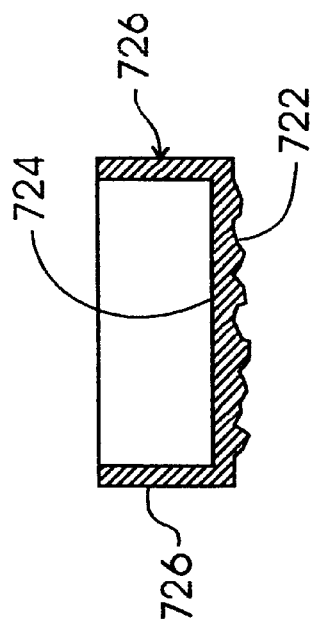
FIG. 14 is a schematic side sectional view of another form of transparent stamp.

FIG. 14 illustrates an alternative form of transparent stamp 721. Stamp 721 has a thin lower central portion 724 that provides that downwardly facing stamping or forming surface 722, and an upstanding sidewall 726 that provides a grippable handle.

Figure 16:
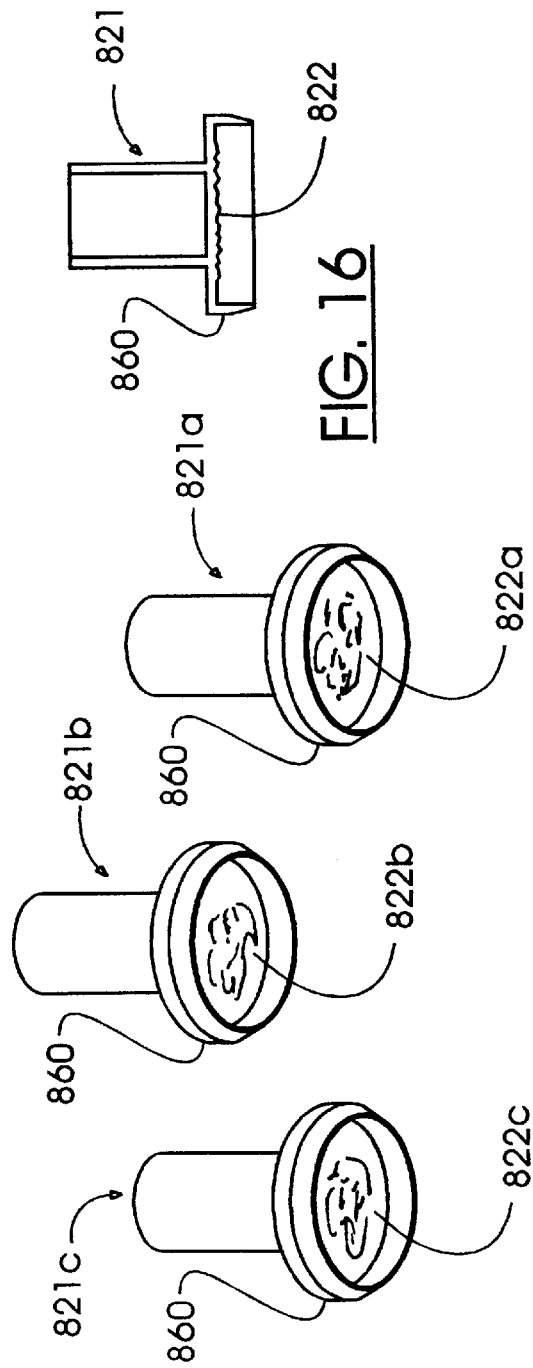
FIG. 16 is a schematic side sectional view of one of the stamps shown in FIG. 15.
Figure 15:
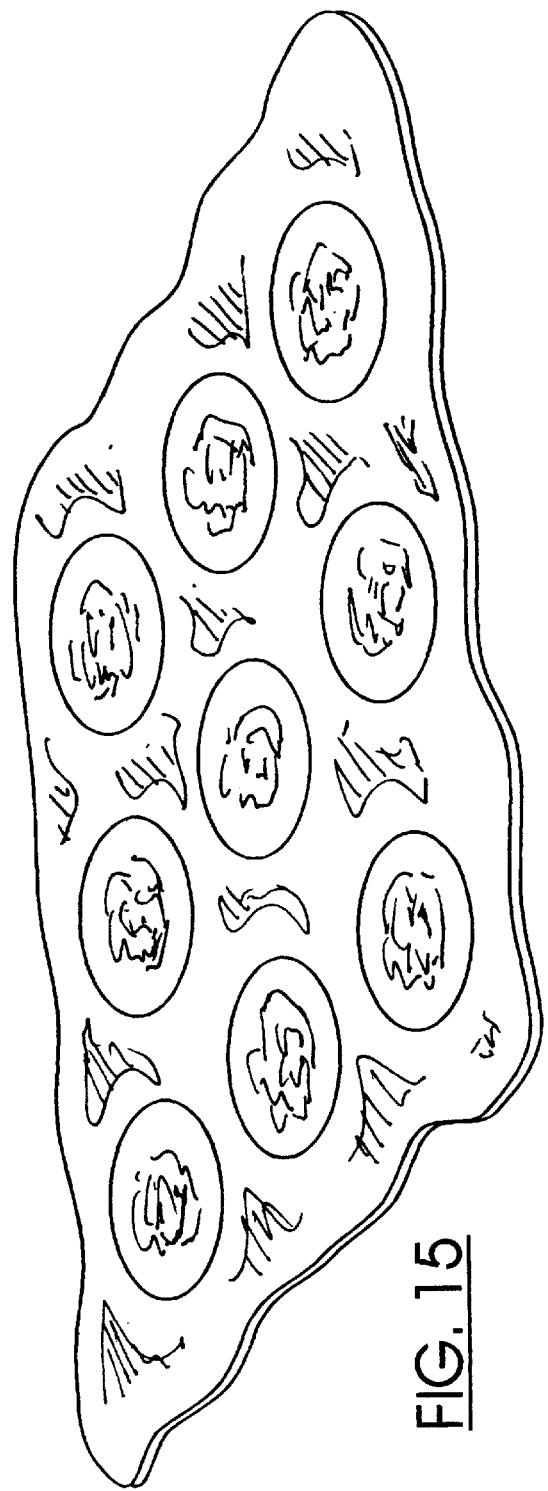
FIG. 15 is a schematic perspective view of a flat sheet of pliant translucent material and several stamps of a modified form.

FIGS. 15 and 16 illustrate another embodiment of stamp 821 similar to stamp 21, but having a circular cutter 860 connected to and thus integrated with a circular stamping or forming surface 822. That stamp 821 is shown being used with a large thin sheet of pliable translucent material rather than individual portions of such material. As the illustrated stamping surface 822 compresses a generally circular area 827 of that sheet of material to form a contoured recessed front surface 829, the cutter 860 cuts that circular area free from the remainder of the sheet of material. FIG. 15 shows three stamps 821a, 821b and 821c, each having a different stamping or forming surface 822a, 822b and 822c respectively.

Figure 20:
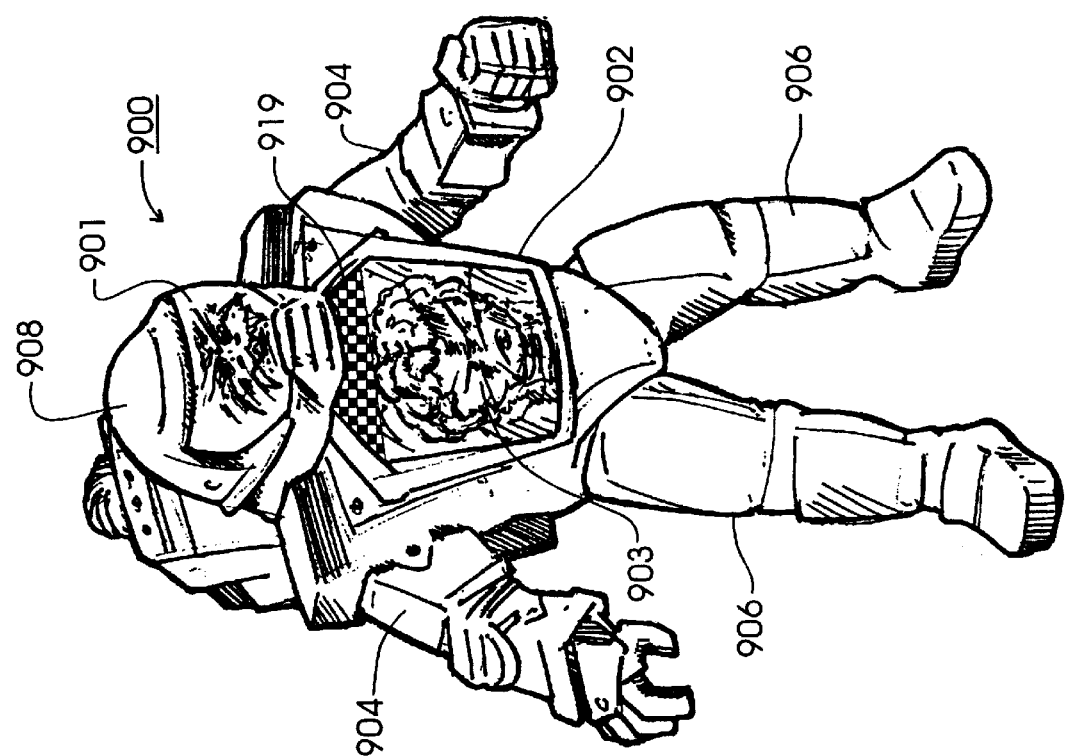
FIG. 20 is a perspective view of a toy figure having a face and a chest plate each provided by a lithophane-type pictorial work.
Figure 21:
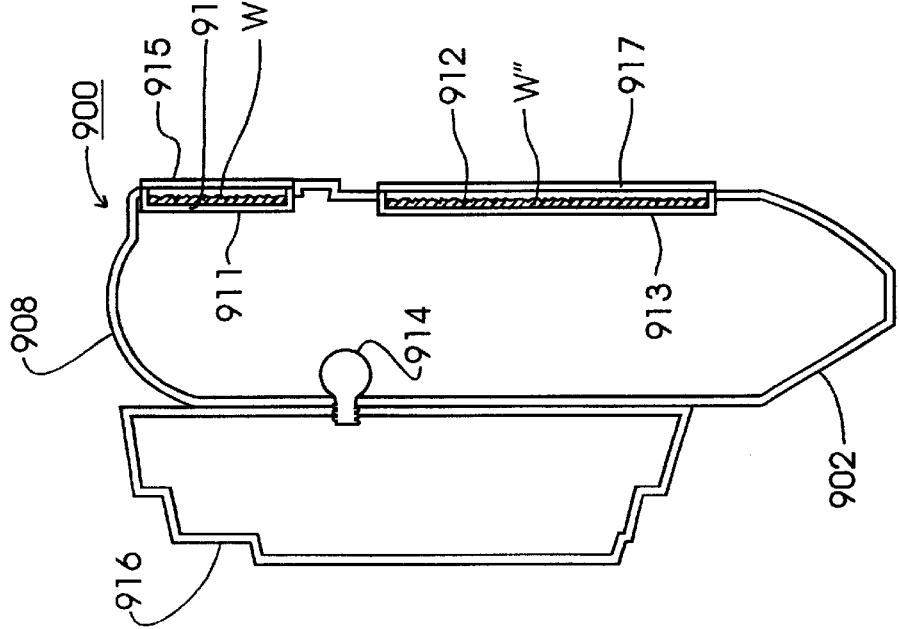
FIG. 21 is an enlarged side sectional view of the toy figure of FIG. 20.

FIGS. 20 and 21 illustrate an apparatus in the form of a toy figure 900 which is a further presently preferred embodiment of the invention. The toy figure 900 is designed to support and display several lithophane-type works W. In particular, one work provides the face 901 of the figure and the other work provides a visual breast plate 903 for the figure, with somewhat of the look of a video or TV screen.

The works W may be produced as described above. By way of example, the base section 323 shown in FIG. 10 may have a plurality of forming surfaces 322 which each provide a different facial appearance. The child user may produce lithophane-type pictorial works of the different faces from any or all of these forming surfaces 322. The child may then select any one of these works for mounting on the toy figure 900 to provide its face 901. The works for the breast plate 903 may be produced and supported on the toy figure in a similar manner. A light source 914 within the toy figure shines through the translucent works to make the selected facial and breast plate graphics viewable to the child user.

More particularly, the toy figure 900 includes a hollow main portion 902, a pair of arms 904, and a pair of legs 906. The main portion 902 forms a lower body portion 905 and an upper head portion 908. At the front of the head portion 908 a forwardly facing receptacle 910 is formed for receiving a translucent work depicting facial features. A suitable translucent facial feature depicting lithophane-type work W' is shown in FIG. 21 received in the receptacle 910. Similarly, there is a forward facing receptacle 912 for receiving a body plate depicting lithophane-type pictorial translucent work W". The rear walls 911,913 of the receptacles 910,912 are transparent or translucent to permit the passage of light through them, and thus through the associated lithophane-type pictorial work W', W". Transparent openable covers or doors 915 and 917 may be supported over the receptacles 910, 912 respectively to assist in retaining the works W', W" in place and to protect them. The light bulb 914 is supported within and at the rear of the main portion 902. The bulb 914 may be powered by any suitable source such as batteries (not shown) contained in a rear compartment 916 secured to the rear of the main portion 902.

Thus the child user may produce one or more lithophane-type pictorial works W' that show facial features for the face 901 of the toy figure and one or more works W" that show a suitable graphic for the breast plate 903 of the toy figure. These works may be mounted in their receptacles 910, 912 and the light 914 turned on to back light the works and cause them to display their respective pictures or images. FIG. 20 illustrates the provision of additional graphic images 919 on the door or covers 917 that then combine with the lithophane-type image produced by the work W'.

Alternatively, transparent walls such as wall 2 of FIGS. 3 and 4 which receive translucent material at their rear side to form thin translucent lithophane-type pictorial works might be utilized and supported at the head and chest of the toy figure.

The lithophane-type works may be displayed in various other ways. For example, instead of on a toy figure, the works could be supported on toy vehicles, toy buildings, etc.

Various modifications and changes may be made in the illustrated structure without departing from the spirit and scope of the present invention as defined by the following claims.

What is claimed is:

1. An activity method for generally instantaneously creating lithophane pictorial works from pliable translucent material, said works each providing a visual 3D image when viewed from the front with light passing though the work from the rear,
   a) providing a contoured three-dimensional forming surface that is the reverse image of the contour of the contoured recessed picture-producing front face of a desired lithophane pictorial work,
   b) positioning a quantity of pliant translucent material adjacent to said surface, and
   c) moving the material and the forming surface toward one another to compress said quantity of such material so as to form to completion the material into a thin translucent panel having the contoured recessed picture-producing front face of the desired lithophane pictorial work in a single generally instantaneous operation.

2. The method of claim 1 wherein steps b) and c) are repeated as many times as desired.

3. The method of claim 1 further including controlling the amount of compression of the material so as to provide a finished work with a thickness within predetermined limits.

4. The method of claim 1 further including shining light through the work from its rear.

5. A method for quickly and easily creating and viewing a lithophane picture by forming a variable thickness lithophane pictorial panel from a formable translucent material in a single operation, the panel being disposed for viewing behind a transparent wall, the transparent wall having a generally flat forward facing surface and a rearwardly facing contoured forming surface that is a reverse image of a contoured recessed picture-producing lithophane front surface of a desired lithophane pictorial work, said method comprising: first engaging formable translucent material with the forming surface so as to form a thin panel of the material having said picture-producing lithophane recessed front surface where the panel interfaces with said forming surface, and then providing light at the rear of the panel and observing the panel of formed translucent material from in front of the forward facing surface of the transparent wall with the light passing through said panel from the rear.

6. The method of claim 1 further including removing the formed material from the forming surface.

* * * * *